United States Patent
Zang et al.

(10) Patent No.: US 10,303,490 B2
(45) Date of Patent: May 28, 2019

(54) APPARATUS AND METHOD FOR OPTIMIZING STARTUP OF EMBEDDED SYSTEM

(71) Applicant: HISENSE ELECTRIC CO., LTD., Qingdao (CN)

(72) Inventors: Xiaohua Zang, Qingdao (CN); Xinlu Wang, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 127 days.

(21) Appl. No.: 15/388,235

(22) Filed: Dec. 22, 2016

(65) Prior Publication Data
US 2017/0132026 A1    May 11, 2017

(30) Foreign Application Priority Data
Jun. 7, 2016    (CN) .......................... 2016 1 0399093

(51) Int. Cl.
| | | |
|---|---|---|
| *G06F 9/44* | (2018.01) | |
| *G06F 9/45* | (2006.01) | |
| *G06F 9/445* | (2018.01) | |
| *G06F 9/4401* | (2018.01) | |
| *G06F 9/48* | (2006.01) | |

(52) U.S. Cl.
CPC ........ *G06F 9/44521* (2013.01); *G06F 9/4401* (2013.01); *G06F 9/44578* (2013.01); *G06F 9/48* (2013.01)

(58) Field of Classification Search
CPC ...... G06F 9/4401; G06F 9/48; G06F 9/44521; G06F 9/44578
See application file for complete search history.

(56) References Cited

U.S. PATENT DOCUMENTS

| | | | | |
|---|---|---|---|---|
| 6,571,388 | B1 * | 5/2003 | Venkatraman | G06F 9/445 717/108 |
| 6,952,756 | B1 * | 10/2005 | Le | G06F 9/383 365/149 |
| 8,266,692 | B2 * | 9/2012 | Wenzinger | G06F 8/60 713/2 |
| 9,928,058 | B1 * | 3/2018 | Beranek | G06F 9/45504 |
| 10,027,777 | B2 * | 7/2018 | Chen | H04L 67/2847 |

(Continued)

OTHER PUBLICATIONS

SeekBin: An Automated Tool for Analyzing Thread Level Speculative Parallelization Potential, 2011, pp. 1-6. https://ieeexplore.ieee.org/stannp/stannp.jsp?tp=&arnumber=6048489 (Year: 2011).*

(Continued)

*Primary Examiner* — Mongbao Nguyen
(74) *Attorney, Agent, or Firm* — Harness, Dickey & Pierce, P.L.C.

(57) ABSTRACT

A method for startup of an embedded system includes: determining whether a current pre-loaded class is an inner class, before pre-loaded classes required for starting an embedded system are loaded in parallel using a plurality of threads; if so, then parsing the current pre-loaded class for recognizing a host class hosting the current pre-loaded class, and determining a thread for loading the host class; and loading the current pre-loaded class using the thread after loading the host class.

4 Claims, 1 Drawing Sheet

(56) References Cited

U.S. PATENT DOCUMENTS

Figure 1:
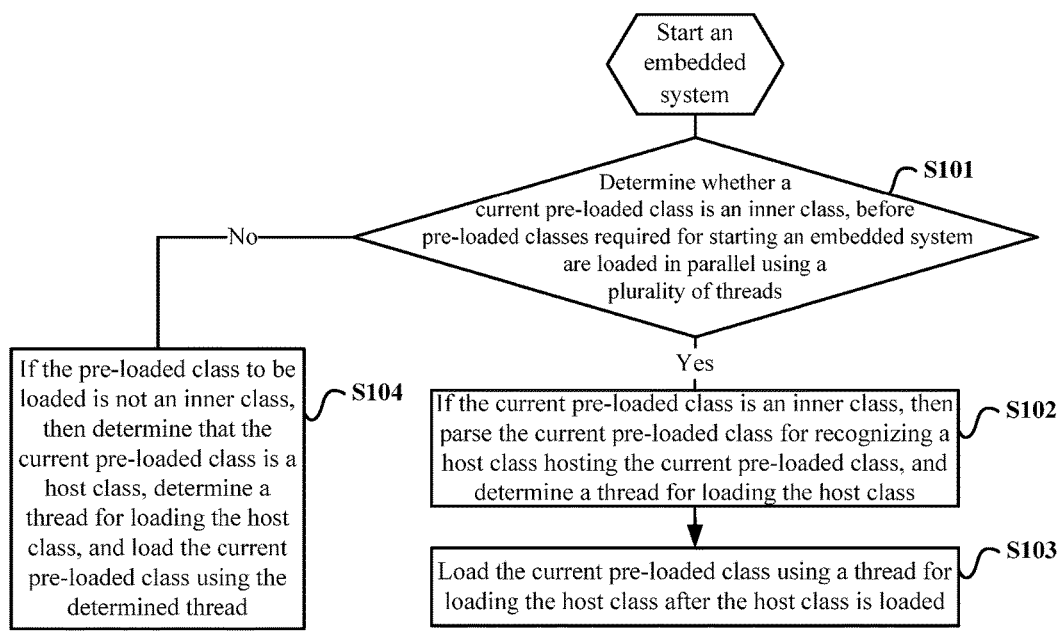

| | | | | |
|---|---|---|---|---|
| 2004/0216044 | A1* | 10/2004 | Martin | G06F 8/10 |
| | | | | 715/273 |
| 2007/0083730 | A1* | 4/2007 | Vorbach | G06F 9/3897 |
| | | | | 712/10 |
| 2007/0208868 | A1* | 9/2007 | Kidd | G06Q 10/107 |
| | | | | 709/229 |
| 2008/0127141 | A1* | 5/2008 | Fulton | G06F 9/44521 |
| | | | | 717/148 |
| 2009/0089548 | A1* | 4/2009 | Sung | G06F 9/30047 |
| | | | | 712/207 |
| 2009/0144697 | A1* | 6/2009 | Foley | G06F 9/4488 |
| | | | | 717/110 |
| 2011/0078413 | A1* | 3/2011 | Yamauchi | G06F 9/30047 |
| | | | | 712/207 |
| 2013/0212334 | A1* | 8/2013 | Michalak | G06F 12/0862 |
| | | | | 711/137 |
| 2013/0311751 | A1* | 11/2013 | Kurihara | G06F 9/3877 |
| | | | | 712/28 |
| 2015/0100951 | A1* | 4/2015 | Raundahl Gregersen | G06F 8/656 |
| | | | | 717/166 |
| 2015/0106596 | A1* | 4/2015 | Vorbach | G06F 9/3001 |
| | | | | 712/221 |
| 2015/0378752 | A1* | 12/2015 | Stoodley | G06F 9/44578 |
| | | | | 717/166 |
| 2016/0103694 | A1* | 4/2016 | Kulkarni | G06F 9/44521 |
| | | | | 717/166 |
| 2017/0131982 | A1* | 5/2017 | Cimadamore | G06F 8/437 |
| 2017/0286065 | A1* | 10/2017 | Zhou | G06F 9/449 |
| 2017/0286255 | A1* | 10/2017 | Kinnear | G06F 11/3604 |

OTHER PUBLICATIONS

Nimit D. Kalaria, Minimizing Boot Time of Android Based Devices, 2013, pp. 1-14. https://www.it.iitb.ac.in/frg/wiki/images/c/cd/10305904_nimit_kalaria_stage_2_report_06_25.pdf (Year: 2013).*

Ghulam Mustafa, SeekBin: An Automated Tool for Analyzing Thread Level Speculative Parallelization Potential, 2011, pp. 1-6. https://ieeexplore.ieee.org/stamp/stamp.jsp?tp=&arnumber=6048489 (Year: 2011).*

Derek Rayside, Compact Java Binaries for Embedded Systems, 2007, pp. 1-14. https://pdfs.semanticscholar.org/a36c/e90300a80d032acbdbbcbda2d0a21ff61430.pdf (Year: 2007).*

Trevor Conrad Meyerowitz, Single and Multi-CPU Performance Modeling for Embedded Systems, 2008, pp. 49-54. https://ptolemy.berkeley.edu/projects/chess/pubs/458/phd_thesis.pdf (Year: 2008).*

* cited by examiner

APPARATUS AND METHOD FOR OPTIMIZING STARTUP OF EMBEDDED SYSTEM

CROSS-REFERENCE TO RELATED APPLICATION

This application claims the benefit and priority of Chinese Patent Application No. 201610399093.9 filed Jun. 7, 2016. The entire disclosure of the above application is incorporated herein by reference.

FIELD

The present disclosure relates to the field of operating systems, and particularly to an apparatus and method for optimizing startup of an embedded system.

BACKGROUND

This section provides background information related to the present disclosure which is not necessarily prior art.

An intelligent TV set includes an all-open platform over which an operating system is carried, and on which a user can install and uninstall pieces of software, game, and applications available from a third-party provider, and such an application platform is advantageous over a platform available from a traditional TV set manufacturer.

At present, typically the Android operating system or another embedded system can be carried over the intelligent TV set; and after the embedded system is started in the intelligent TV set, the user can access various application services including searching over a network, Video on Demand, digital music, news over the network, a video call over the network, etc., using the respective installed applications, so that the user can be provided a more convenient experience.

In a real application, the embedded system is started in the steps of powering on the system, booting the system, starting the kernel, creating the initialization process, creating a program library Runtime required for the system to operate, creating the Demon process, creating the user process incubator Zygote, creating the Virtual Machine (VM), creating the system server process, and starting the application Launcher.

In fact, the embedded system needs to be started by loading a series of fundamental classes (referred to as preloaded classes in this context). These fundamental classes loaded by the Zygote process as preloaded classes of the embedded system reside in a memory, so that a subsequent application or service will be started without loading these preloaded classes again to thereby shorten a period of time for starting the application or service.

SUMMARY

This section provides a general summary of the disclosure, and is not a comprehensive disclosure of its full scope or all of its features.

Some embodiments of the disclosure provide an apparatus for optimizing startup of an embedded system, the apparatus includes:

a class detecting unit configured to determine whether a current pre-loaded class is an inner class, before pre-loaded classes required for starting an embedded system are loaded in parallel using a plurality of threads;

a class parsing unit configured, when the current pre-loaded class is the inner class, to parse the current pre-loaded class for recognizing a host class hosting the current pre-loaded class;

a thread determining unit configured, when the current pre-loaded class is the inner class, to determine a thread for loading the host class hosting the current pre-loaded class; and a class loading unit configured, when the current pre-loaded class is the inner class, to load the current pre-loaded class after loading the host class hosting the current pre-loaded class using the thread determined by the thread determining unit.

Some embodiments of the disclosure further provide an apparatus for optimizing startup of an embedded system, the apparatus includes a memory in which computer readable program is stored, and at least one processor configured to execute the computer readable program:

to determine whether a current pre-loaded class is an inner class, before pre-loaded classes required for starting an embedded system are loaded in parallel using a plurality of threads;

if so, to parse the current pre-loaded class for recognizing a host class hosting the current pre-loaded class, and to determine a thread for loading the host class; and to load the current pre-loaded class using the thread after loading the host class.

Some embodiments of the disclosure further provide a method for optimizing startup of an embedded system, the method includes:

determining whether a current pre-loaded class is an inner class, before pre-loaded classes required for starting an embedded system are loaded in parallel using a plurality of threads;

if so, then parse the current pre-loaded class for recognizing a host class hosting the current pre-loaded class, and determining a thread for loading the host class; and loading the current pre-loaded class using the thread after loading the host class.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure

DRAWINGS

The drawings described herein are for illustrative purposes only of selected embodiments and not all possible implementations, and are not intended to limit the scope of the present disclosure.

Figure 2:
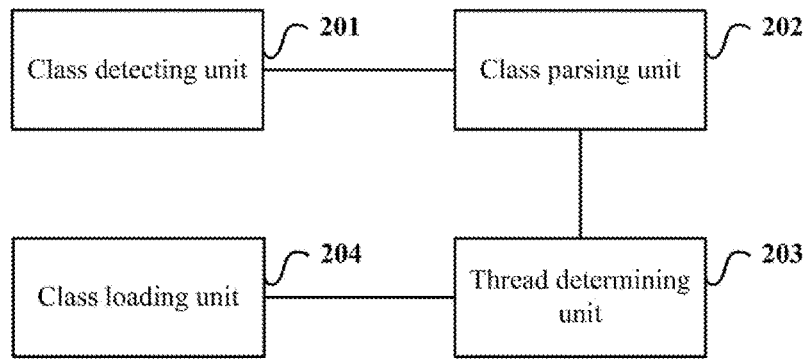

FIG. 1 is a schematic flow chart of a method for optimizing startup of an embedded system according to some embodiments of the disclosure; and FIG. 2 is a schematic structural diagram of an apparatus for optimizing startup of an embedded system according to some embodiments of the disclosure.

Corresponding reference numerals indicate corresponding parts or features throughout the several views of the drawings.

DETAILED DESCRIPTION

Example embodiments will now be described more fully with reference to the accompanying drawings.

Those skilled in the art can appreciate that all the terms used here (including technological terms and scientific terms) have the same meaning as generally construed by those ordinarily skilled in the art unless they are otherwise defined. It shall be further appreciated that such terms as defined in a general dictionary shall be construed as meaning consistent with their meaning in the context in the prior art, and they will not be construed as idealized or overly formal meaning unless specifically defined as they are defined here.

The existing intelligent TV set is started at a low speed primarily for the reason that after Zygote (the user process incubator) is created, these pre-loaded classes are loaded in a single thread, that is, they are loaded in series. In fact, there are generally hundreds of pre-loaded classes to be loaded in the embedded system, and if all the pre-loaded classes in the embedded system are loaded in sequence by cycling a single task, then it will take a long period of time to load them; and for a multi-core CPU, only one of the cores operates throughout the loading process, so that the other cores actually remain idle, thus resulting in a waste thereof. In a real application, the system server cannot further operate to start the embedded system, until all the pre-loaded classes are loaded by Zygote, so that the speed of starting the embedded system is restrained by the speed of loading the pre-loaded classes.

In view of this, a plurality of threads can be started according to the number of cores in the Central Processing Unit (CPU) of the embedded system; and thereafter the pre-loaded classes required for the embedded system are loaded in parallel using the threads, so that the pre-loaded classes can be loaded in parallel to thereby improve the speed of loading the pre-loaded classes so as to improve the speed of starting the embedded system, as compared with the prior art in which they are loaded in a single thread.

Furthermore there are inner classes for some of the pre-loaded classes to be loaded for the embedded system. In a real application, if a class is loaded in the java language, then a standard form of information about the class will be defined as:

package1[.package2 . . . ].classname$subclassname.

Where "classname" represents the name of a host class, and "subclassname" represents the name of an inner class of the host class, so that the system can locate the class, and the inner class thereof according to package1/package2/ . . . /packageN/class, and load them into a memory.

In a real application, the pre-loaded classes to be loaded for the embedded system can be categorized into three categories: pre-loaded classes including inner classes, pre-loaded classes which exist as inner classes, and pre-loaded classes which neither include inner classes nor exist as inner classes. For the sake of a convenient description, both the pre-loaded classes including inner classes, and the pre-loaded classes which neither include inner classes nor exist as inner classes can be referred to as host classes in this context. Stated otherwise, some host classes include inner classes, and as depicted in Table 1, pre-loaded classes numbered 37 to 41 are inner classes of a pre-loaded class numbered 36; and the pre-loaded class numbered 36 is a host class hosting the pre-loaded classes numbered 37 to 41. Some host classes do not include inner classes, for example, pre-loaded classes numbered 34, 35, and 42 to 44 are host classes which do not include inner classes.

TABLE 1

Configuration files of pre-loaded classes

| No. | Pre-load class |
|---|---|
| . . . | . . . |
| 34 | android.animation.AnimatorInflater |
| 35 | android.animation.AnimatorListenerAdapter |
| 36 | android.animation.AnimatorSet |
| 37 | android.animation.AnimatorSet$AnimatorSetListener |
| 38 | android.animation.AnimatorSet$Builder |
| 39 | android.animation.AnimatorSet$Dependency |
| 40 | android.animation.AnimatorSet$DependencyListener |
| 41 | android.animation.AnimatorSet$Node |
| 42 | android.animation.FloatEvaluator |
| 43 | android.animation.FloatKeyframeSet |
| 44 | android.animation.IntEvaluator |
| . . . | . . . |

In a real application, an inner class may be loaded dependent upon loading of a host class thereof, that is, the inner class of the host class cannot be loaded until the host class is loaded; otherwise, the inner class may fail to be loaded due to the absence of a loading precondition, so that the system may subsequently operate abnormally. In view of this, if the pre-loaded class is loaded in parallel using another thread, then such a situation may occur that results in a failure with loading them: if an inner class X1 of a host class X starts to be loaded using a thread B while the host class X is loaded using a thread A, then such abnormality will occur with loading that the system may operate abnormally.

In order to avoid the situation above from occurring, before the pre-loaded class is loaded, the current pre-loaded class can be detected, it can be determined whether the current pre-loaded class is an inner class, and if so, then the thread of the host class hosting the pre-loaded class will be determined, and after the host class is loaded using the thread, then the inner class will be further loaded using the thread, so that the host class, and all the inner classes of the host class are loaded using the same thread, and the inner classes are loaded normally after the host class, thus ensuring the system to operate normally.

The technical solution according to the disclosure will be described below in details with reference to the drawings.

In a real application, in the solution for optimizing startup of an embedded system according to the disclosure, the embedded system needs to be initially started by powering on the system, booting the system, starting the kernel, and creating the initialization process. Thereafter the Zygote (incubator) process can be created using the created initialization process. Furthermore Runtime (the program library required for the system to operate), and the Demon process can be further created using the initialization process.

After the Zygote process is created, a Virtual Memory (VM) can be created, and the created VM can be started by assigning respective parameters. For example, typically there is a memory of no more than 16 MB to be loaded for an application, so the parameter Heapsize can be set to 16 MB using the Zygote process, where the parameter Heapsize represents the largest memory available to a single process. After the VM is created and started by the Zygote process, a Java Native Interface (JNI) function can be registered for java classes, so that the Zygote process can invoke Java codes. Furthermore java classes required for the embedded system, and some resources of the embedded system are loaded.

In a real application, there are typically more than one thousand of pre-loaded classes required for the embedded system, and there are a number of pre-loaded classes to be loaded for longer than 1250 microsecond. If these pre-loaded classes are loaded in a single thread as in the prior art, then it will take a long period of time to load them, thus seriously prolonging the loading of the embedded system.

In a real application, as the multi-core technology is developing, two or more integral computing engines (cores) can be integrated in a processor of the existing intelligent terminal. In view of this, a task can be divided so that it can be executed using a number of executing cores in a thread application, and more tasks can be executed in a specific period of time. Accordingly in the solution according to the disclosure, before the pre-loaded classes are loaded using the Zygote process, firstly a plurality of threads can be started according to the number of cores in the central processing unit to load the pre-loaded classes in parallel so as to improve the speed of starting the system.

In order to avoid such an abnormal situation occurring while the pre-loaded classes are being loaded in parallel using the threads that if an inner class is loaded before a host class thereof is loaded, then the inner class will fail to be loaded due to the absence of a loading precondition, some embodiments of the disclosure provide a method for optimizing startup of an embedded system in a flow as illustrated in FIG. 1, where the method can include the following steps:

S101 is to determine whether a current pre-loaded class is an inner class, before pre-loaded classes required for starting an embedded system are loaded in parallel using a plurality of threads, and if so, to proceed to the step S102; otherwise, to proceed to the step S104.

In a real application, the pre-loaded classes can be recorded in rows in such a configuration file of pre-loaded classes that includes a list of all the pre-loaded classes of the embedded system as depicted in Table 1; and for each host class, inner classes thereof can be recorded consecutively following the record of the host class, where the pre-loaded classes can be recorded in a preset format, e.g., <Host class>$<Inner class>, or [Any number of characters N1]$ [Any number of characters N2], where N1 represents a host class, and N2 represents an inner class. For an inner class, the name of the inner class is typically recorded at the position of the inner class, and the name of a host class hosting the inner class is recorded at the position of the host class; and for the host class, there is no record at the position of the inner class, that is, there is a null record at the position of the inner class.

In view of this, in some embodiments of the disclosure, before the pre-loaded classes required for starting the embedded system are loaded in parallel using a plurality of threads, the current pre-loaded class can be parsed in a preset parsing format for the corresponding record of the current pre-loaded class at the position of the inner class Subsequently it is determined whether the corresponding record of the current pre-loaded class at the position of the inner class is null, and if so, then it will be determined that the current pre-loaded class is a host class, and the flow will proceed to the step S104; otherwise, it will be determined that the current pre-loaded class is an inner class, and the flow will proceed to the step S102, where the preset parsing format includes the position of the host class, and the position of the inner class, between which a space mark can be arranged.

For example, while the embedded system is being started, the Zygote process can read the pre-loaded class N in the configuration file of pre-loaded classes in sequence; and parse the current pre-loaded class N to be loaded, according to the format of <Host class>$<Inner class>, and determine whether the current pre-loaded class N is an inner class.

For example, in the format of <Host class>$<Inner class>, the host class is recorded as HC, and the inner class is recorded as IC; and if it is detected that IC is null in the current pre-loaded class N, then it will indicate that the current pre-loaded class N is not an inner class; and if it is detected that IC is not null in the current pre-loaded class N, then it will indicate that the current pre-loaded class N is an inner class.

Alternatively the current pre-loaded class N is matched with a preset format of [N1]$[N2], and if it is matched successfully with [N1]$[N2], then the class will be an inner class; otherwise, the class will be a host class.

If it is determined that the current pre-loaded class N is a host class, then the flow will proceed to the step S104; and if it is determined that the current pre-loaded class N is an inner class, then the flow will proceed to the step S102.

The step S102 is, if the current pre-loaded class is an inner class, to parse the current pre-loaded class for determining a host class hosting the current pre-loaded class, and to determine a thread to load the host class.

In the solution according to the disclosure, the pre-loaded classes are loaded in parallel using a plurality of threads, and in order to ensure an inner class to be loaded with the presence of a loading precondition, a host class, and an inner class thereof can be loaded using the same thread, and the inner class will not be loaded until the host class is loaded using the thread.

In view of this, in some embodiments of the disclosure, after it is determined that the current pre-loaded class is an inner class, the thread for loading the host class hosting the pre-loaded class will be determined as a thread for loading the current pre-loaded class.

Optionally if it is determined in the step S101 that the current pre-loaded class is an inner class, then the current pre-loaded class will be parsed according to the preset parsing format for the corresponding record thereof at the position of the host class; and the obtained record will be determined as the host class hosting the current pre-loaded class.

Further to the example above, in the format of <Host class>$<Inner class>, the host class is recorded as HC, and the inner class is recorded as IC; and if it is detected that IC is not null in the current pre-loaded class N, then the current pre-loaded class N will be parsed for the corresponding record of HC, and the obtained record will be determined as a host class hosting the current pre-loaded class N.

In a real application, the inner class of the host class is recorded in the configuration file of pre-loaded classes immediately after the host class is recorded as in the format above, so that after the current pre-loaded class is determined, the pre-loaded class previously detected as a host class can be determined in the configuration file of pre-loaded classes as the host class hosting the current pre-loaded class.

After the host class hosting the current pre-loaded class which is an inner class is determined, the thread for loading the host class is determined. Optionally, a currently idle thread can be located and determined as the thread for loading the host class; or a preset thread corresponding to the host class can be determined as the thread for loading the host class; or a thread currently loading the host class can be determined as the thread for loading the host class.

Here the preset thread corresponding to the host class can refer to a thread preset corresponding to the host class required for starting the system, before the Zygote process loads the pre-loaded classes.

If the pre-loaded classes required for the embedded system are loaded in parallel using a plurality of threads, then the pre-loaded classes may need to be allocated, that is, threads for executing the pre-loaded classes need to be determined. In a real application, there are some pre-loaded classes dependent upon each other among the pre-loaded classes required for the embedded system. For example, a pre-loaded class A is dependent upon a pre-loaded class B, that is, the pre-loaded class A shall be loaded after the pre-loaded class B is loaded.

In view of this, in order to avoid the pre-loaded classes from affecting each other, before they are loaded, a part of the pre-loaded classes in the configuration file of pre-loaded classes can be grouped in advance, so that there will be no interdependency between pre-loaded classes in one group, and pre-loaded classes in another group. Optionally after the number of cores in the central processing unit is obtained, the configuration file of pre-loaded classes can be read, and all the host classes can be obtained from the configuration file; and all the obtained host classes can be divided into a corresponding number of groups according to the obtained number of cores, where there is no interdependency between pre-loaded classes in one group, and pre-loaded classes in another group, so that the embedded system can be started by starting such a corresponding number of threads according to the number of cores in the central processing unit that correspond respectively to the different groups to thereby load the pre-loaded classes in the corresponding groups. The preset threads corresponding to the host classes are the threads corresponding to the groups including the host classes.

Here the number of cores in the central processing unit can be obtained by reading the system file cat/proc/cpuinfo, and filtering the Processor field therein. For example, if there are two cores in the embedded system, then a result of filtering above will be:

Processor: 0
Processor: 1

For example, if the number of cores in the central processing unit is 4, then all the host classes in the configuration file of pre-loaded classes of the embedded system will be divided into four groups, so that the pre-loaded classes can be subsequently loaded by loading the pre-loaded classes in the groups corresponding to four respective threads, where the threads to load the host classes are the threads corresponding to the groups including the host classes.

The step S103 is to load the current pre-loaded class using a thread for loading the host class after the host class is loaded.

In a real application, the inner classes of the respective host classes are consecutively recorded in the configuration file of pre-loaded classes including the list of all the pre-loaded classes of the embedded system. In view of this, typically firstly a host class, and then inner classes of the host class are read, so that the inner classes of the host class will not be read, detected, loaded, etc., until the host class is loaded. However since an inner class is loaded dependent upon the loading of a host class thereof, if such an abnormal situation occurs that an inner class of some host class read before the host class hosting the inner class, then after a thread for loading the host class hosting the inner class is determined, the inner class will not be loaded until the host class has been loaded using the thread, thus avoiding the system from operating abnormally.

Optionally in order to ensure the inner class to be loaded with the presence of a loading precondition, after the host class hosting the current pre-loaded class, and the thread for loading the host class are determined in the step S102, it can be determined whether the host class has been loaded using the thread for loading the host class, and after the host class is loaded, the inner class of the host class of the current pre-loaded class, i.e., the inner class of the host class, is loaded using the thread.

In a real application, after the current pre-loaded class is loaded, a next pre-loaded class to be loaded in the configuration file of pre-loaded classes can be read, and the step S101 can be performed; and if the current pre-loaded class is the last pre-loaded class in the configuration file of pre-loaded classes, then the embedded system can be started by creating the System Server, starting the application Launcher, etc.

The step S104 is, if the pre-loaded class to be loaded is not an inner class, to determine that the current pre-loaded class is a host class, to determine a thread for loading the host class, and to load the current pre-loaded class using the determined thread.

In some embodiments of the disclosure, if it is determined in the step S101 that the current pre-loaded class is not an inner class, then it will indicate that the current pre-loaded class is a host class including an inner class, or a pre-loaded class which neither includes an inner class nor exists as an inner class. Both the pre-loaded class including an inner class, and the pre-loaded class which neither includes an inner class nor exists as an inner class can be referred to as host classes in this context. Accordingly in this context, if it is determined that the current pre-loaded class is not an inner class, then it will be determined that the current pre-loaded class is a host class.

In order to start the embedded system, after it is determined that the current pre-loaded class is a host class, the thread for loading the host class can be further determined. Optionally, a currently idle thread can be located and determined as the thread for loading the host class; or a preset thread corresponding to the host class can be determined as the thread for loading the host class; or a thread currently loading the host class can be determined as the thread for loading the host class.

Here the preset thread corresponding to the host class can refer to a thread preset corresponding to the host class required for starting the system, before the Zygote process loads the pre-loaded classes. Optionally all the host classes can be divided into a corresponding number of groups according to the number of cores in the central processing unit, where there is no interdependency between pre-loaded classes in one group, and pre-loaded classes in another group, so that the embedded system can be started by starting such a corresponding number of threads according to the number of cores in the central processing unit that correspond respectively to the different groups to thereby load the pre-loaded classes in the corresponding groups. Accordingly the group including the pre-loaded class can be located directly, the thread corresponding to the located group can be determined as the thread for loading the current pre-loaded class, and the current pre-loaded class can be loaded using the determined thread.

In a real application, after the current pre-loaded class is loaded, a next pre-loaded class to be loaded in the configuration file of pre-loaded classes can be read, and the step S101 can be performed; and if the current pre-loaded class is the last pre-loaded class in the configuration file of pre-loaded classes, then the embedded system can be started by creating the System Server, starting the application Launcher, etc.

In some embodiments of the disclosure, after all the pre-loaded classes required for the embedded system are loaded in the step 103 and/or the step 104, the System Server process of the embedded system can be further created using the Zygote process. Thereafter the application Launcher of the embedded system is started by the Activity Manger Service started by the created System Server process.

In a real application, both the Activity Manager Service and the Package Manager Service are started by the System Server process while the embedded system is being started.

Optionally the System Server process firstly starts the Package Manager Service responsible for installing applications of the embedded system as follows: the Package Manager Service scans a specific directory in the embedded system for application files (e.g., ".Apk" files); and then the Package Manager Service parses the located application files for information about the applications, and installs the applications based upon the obtained information about the applications.

After the applications in the embedded system are installed, the System Server process next starts the application Launcher using the Activity Manager Service. Furthermore the Launcher being started can present the applications installed in the embedded system on the desktop of the intelligent terminal in the form of shortcut icons through the Package Manager Service to thereby start the embedded system, so that the user can access the applications.

Further to the method above for optimizing startup of an embedded system, some embodiments of the disclosure further provide an apparatus for optimizing startup of an embedded system as illustrated in FIG. 2, where the apparatus includes a class detecting unit 201, a class parsing unit 202, a thread determining unit 203, and a class loading unit 204.

Here the class detecting unit 201 is configured to determine whether a current pre-loaded class is an inner class, before pre-loaded classes required for starting an embedded system are loaded in parallel using a plurality of threads.

Optionally the class detecting unit 201 is configured to parse the current pre-loaded class in a preset parsing format for a corresponding record thereof at the position of an inner class; to determine whether the corresponding record of the current pre-loaded class at the position of the inner class is null; and if so, to determine that the current pre-loaded class is a host class; otherwise, to determine that the current pre-loaded class is an inner class.

The class parsing unit 202 is configured, if the current pre-loaded class is an inner class, to parse the current pre-loaded class for a host class hosting the current pre-loaded class.

Optionally if the current pre-loaded class is an inner class, then the class parsing unit 202 will parse the current pre-loaded class according to the preset parsing format for a corresponding record thereof at the position of the host class; and to determine the obtained record as the host class hosting the current pre-loaded class.

The thread determining unit 203 is configured, if the current pre-loaded class is an inner class, to determine a thread for loading the host class hosting the current pre-loaded class.

Optionally the thread determining unit 203 is configured to locate and determine a currently idle thread as the thread for loading the host class; or to determine a preset thread corresponding to the host class as the thread for loading the host class; or to determine a thread currently loading the host class as the thread for loading the host class.

The class loading unit 204 is configured, if the current pre-loaded class is an inner class, to load the current pre-loaded class after loading the host class hosting the current pre-loaded class using the loading thread determined by the thread determining unit 203.

Further the thread determining unit 203 is further determined, if the current pre-loaded class is a host class, to determine a thread for loading the host class. Accordingly the class loading unit 204 is further configured, if the current pre-loaded class is a host class, to load the current pre-loaded class using the loading thread determined by the thread determining unit 203.

Further to the method above for optimizing startup of an embedded system, some embodiments of the disclosure further provide an apparatus for optimizing startup of an embedded system, where the apparatus includes a memory in which computer readable program is stored, and at least one CPU configured to execute the computer readable program:

To determine whether a current pre-loaded class is an inner class, before pre-loaded classes required for starting an embedded system are loaded in parallel using a plurality of threads;

If the current pre-loaded class is an inner class, to parse the current pre-loaded class for a host class hosting the current pre-loaded class;

If the current pre-loaded class is an inner class, to determine a thread for loading the host class hosting the current pre-loaded class; and If the current pre-loaded class is an inner class, to load the current pre-loaded class after loading the host class hosting the current pre-loaded class using the determined loading thread.

In some embodiments, the CPU is configured to execute the computer readable program to determine whether the current pre-loaded class is an inner class by:

Parsing the current pre-loaded class in a preset parsing format for a corresponding record thereof at the position of an inner class; determining whether the corresponding record of the current pre-loaded class at the position of the inner class is null; and if so, determining that the current pre-loaded class is a host class; otherwise, determining that the current pre-loaded class is an inner class.

In some embodiments, the CPU is configured to execute the computer readable program to parse the current pre-loaded class for the host class by:

If the current pre-loaded class is an inner class, parsing the current pre-loaded class according to the preset parsing format for a corresponding record thereof at the position of the host class; and determining the obtained record as the host class hosting the current pre-loaded class.

In some embodiments, the CPU is configured to execute the computer readable program to determine the loading thread:

Locating and determining a currently idle thread as the thread for loading the host class; or to determine a preset thread corresponding to the host class as the thread to load the host class; or determining a thread currently loading the host class as the thread for loading the host class.

In some embodiments, the CPU is further configured to execute the computer readable program:

If the current pre-loaded class is a host class, to determine a thread for loading the host class.

In some embodiments, the CPU is further configured to execute the computer readable program:

If the current pre-loaded class is a host class, loading the current pre-loaded class using the determined loading thread.

In order to shorten the period of time for loading the pre-loaded classes, and to improve the speed of starting the embedded system, in the solution according to the disclosure as compared with the prior art in which they are loaded in parallel using the threads, before the pre-loaded classes required for starting the embedded system are loaded in parallel using the threads, the pre-loaded classes are detected, and the thread to load the host class hosting the inner class is determined, so that the host class, and the inner class thereof are loaded using the same thread, and firstly the host class, and then the inner class are loaded, to thereby avoid such an abnormal situation from occurring that the inner class loaded with the absence of a loading precondition may fail to be loaded, so as to ensure the system to subsequently operate normally, thus improving the stability of the system in operation.

Those skilled in the art can appreciate that the disclosure includes devices relating to one or more of the operations in the disclosure. These devices can be designed and manufactured specifically for the purpose as needed, or can include known devices in general-purpose computers. These devices include such computer programs stored therein that are selectively activated or reconstructed. Such computer programs can be stored in a device (e.g., computer) readable medium, or any type of medium adapted to store electronic instructions, and coupled respectively to a bus, where the computer readable medium includes but will not be limited to any type of disk (including a floppy disk, a hard disk, an optic disk, a CD-ROM, and an optic-magnetic disk), a Read-Only Memory (ROM), a Random Access Memory (RAM), an Erasable Programmable Read-Only Memory (EPROM), an Electrically Erasable Programmable Read-Only Memory (EEPROM), a flash memory, a magnetic card, or a light ray card. Stated otherwise, the readable medium includes any medium in or over which information can be stored or transmitted by the device (e.g., the computer) in a read-only form.

Those skilled in the art can appreciate that each block in these structural diagrams and/or block diagrams and/or flow charts, and each combination of blocks in these structural diagrams and/or block diagrams and/or flow charts can be implemented using computer program instructions. Those skilled in the art can appreciate that these computer program instructions can be provided to a general-purpose computer, a specialized computer, or other processors programmable to process data for execution, so that the solution specified in one or more blocks in the structural diagrams and/or block diagrams and/or flow charts according to the disclosure can be implemented using the computers or the other processors programmable to process data.

Those skilled in the art can appreciate that the steps, measures, and schemes in the respective operations, methods, and flows as discussed in the disclosure can be replaced, varied, rearranged, decomposed, combined, or deleted. Furthermore the steps, measures, and schemes in the respective operations, methods, and flows as disclosed in the disclosure can also be replaced, varied, rearranged, decomposed, combined, or deleted in the prior art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method executed by at least one processor for starting up an embedded system, the method comprising:
  loading pre-loaded classes in parallel to improve the speed of starting the embedded system by the at least one processor;
  parsing a current pre-loaded class using a preset parsing format to obtain an inner class record of pre-loaded class;
  determining that the current pre-loaded class is an inner class, before the pre-loaded classes required for starting the embedded system are loaded in parallel using a plurality of threads, when the inner class record is not null;
  determining that the current pre-loaded class is a host class when the inner class record is null;
  when the current pre-loaded class is the inner class, parsing the current pre-loaded class to recognize a host class hosting the current pre-loaded class,
  wherein parsing the current pre-loaded class to recognized the host class includes parsing the current pre-loaded class according to the preset parsing format to obtain a host class record of the current pre-loaded class; and
  determining a loading class corresponding to obtained host class record as the host class hosting the current pre-loaded class;
  determining a thread for loading the host class, wherein determining a thread for loading the host class includes locating and determining a currently idle thread as the thread for loading the host class; and
  loading the current pre-loaded class in a memory using the determined thread after loading the host class.

2. The method according to claim 1, further comprising, when the current pre-loaded class is a host class, determining a thread for loading the host class, and
  loading the current pre-loaded class in the memory using the loading thread determined when the current pre-loaded class is a host class.

3. An apparatus for startup of an embedded system, the apparatus comprising:
  a memory in which a computer readable program is stored, and
  at least one processor configured to execute the computer readable program to:
  load pre-loaded classes in parallel to improve the speed of starting the embedded system by the at least one processor;
  parse a current pre-loaded class using a preset parsing format to obtain an inner class record of the pre-loaded class;
  determine that the current pre-loaded class is an inner class, before the pre-loaded classes required for starting an embedded system are loaded in parallel using a plurality of threads when the inner class record is not null;
  determining that the current pre-loaded class is a host class when the inner class record is null;
  when the current pre-loaded class is the inner class, parse the current pre-loaded class to recognize a host class hosting the current pre-loaded class, wherein parsing the current pre-loaded class to recognize the host class includes parsing the current pre-loaded class according to the preset parsing format to obtain a host class record of the current pre-loaded class; and determining a loading class corresponding to the obtained host class record as the host class hosting the current pre-loaded class;

determine a thread for loading the host class, wherein determining the thread for loading the host class includes locating and determining a currently idle thread as the thread for loading the host class; and load the current pre-loaded class in the memory using the determined thread after loading the host class.

4. The apparatus according to claim 3, wherein the at least one processor is further configured to execute the computer readable program to:

when the current pre-loaded class is a host class, determine a thread for loading the host class, and load the current pre-loaded class using the thread determined when the current pre-loaded class is a host class.

* * * * *